No. 732,302. PATENTED JUNE 30, 1903.
P. J. JOHANSSON & L. L. JONSSON.
PLOW.
APPLICATION FILED APR. 6, 1903.
NO MODEL.
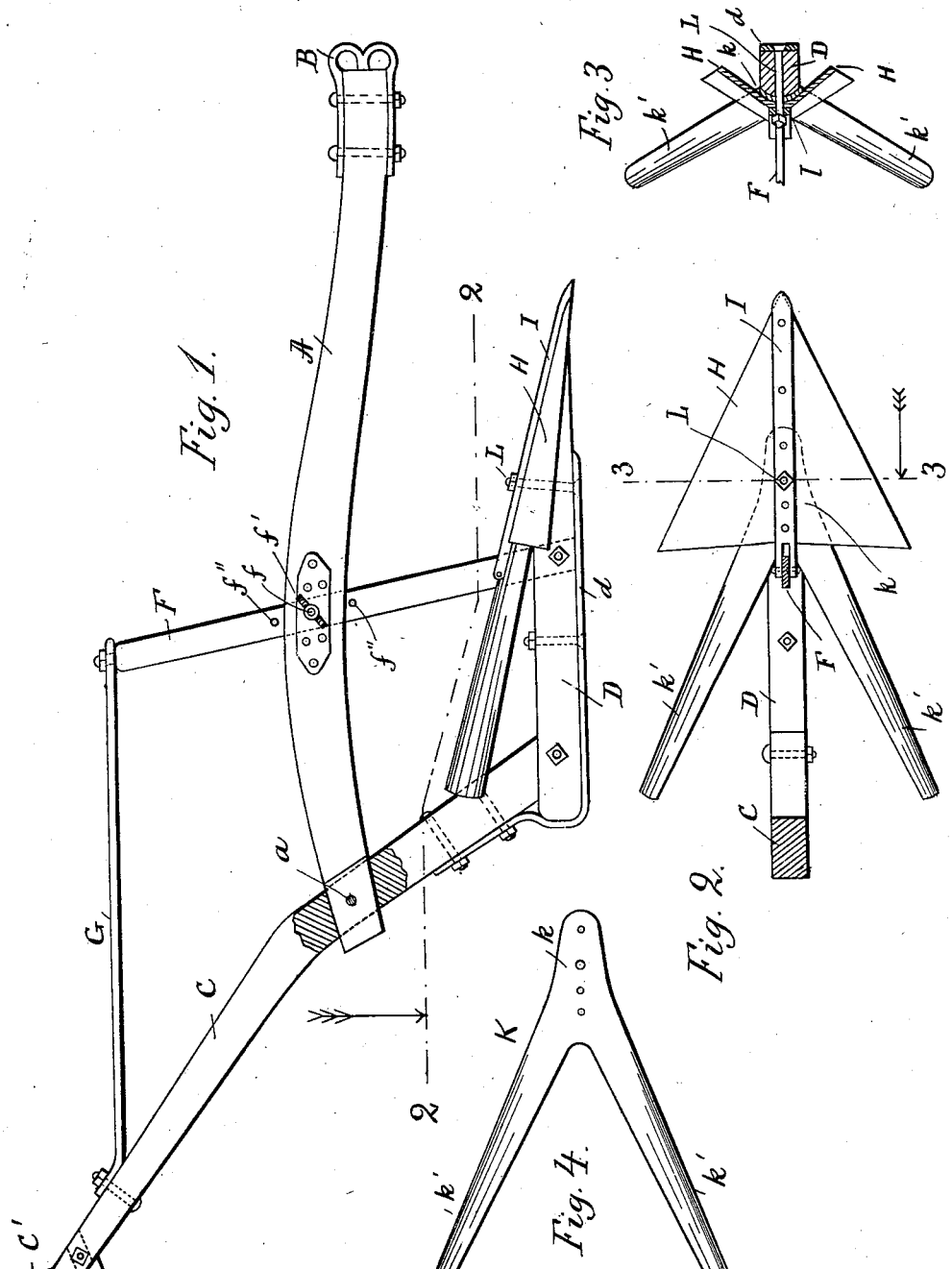
Witnesses.
Lauritz N. Möller
Anna B. Hammerich
Inventors.
Per J. Johansson
and Lage L. Jonsson.
by Allan Andrén, their atty.
THE NORRIS PETERS CO., PHOTO-LITHO., WASHINGTON, D. C.

No. 732,302. Patented June 30, 1903.

UNITED STATES PATENT OFFICE.

PER J. JOHANSSON AND LAGE L. JONSSON, OF WEST CHELMSFORD, MASSACHUSETTS.

PLOW.

SPECIFICATION forming part of Letters Patent No. 732,302, dated June 30, 1903.

Application filed April 6, 1903. Serial No. 151,213. (No model.)

*To all whom it may concern:*

Be it known that we, PER J. JOHANSSON and LAGE L. JONSSON, both citizens of Sweden, and residents of West Chelmsford, in the county of Middlesex and State of Massachusetts, have jointly invented certain new and useful Improvements in Plows, of which the following is a specification.

This invention relates to improvements in plows adapted for use preparatory to planting potatoes, beets, carrots, or similar vegetables, and has also for its object the pulverizing of the earth and covering of the seeds after planting. The device is furthermore adapted for use in digging up the said vegetables when ripe, as will hereinafter be more fully shown and described, reference being had to the accompanying drawings, wherein—

Figure 1 is a side elevation of the improved plow, partly shown in section. Fig. 2 is a horizontal section on the line 2 2 shown in Fig. 1. Fig. 3 is a cross-section on the line 3 3 shown in Fig. 2, and Fig. 4 is a detail top plan view of the pulverizer attachment shown as detached from the bill of the plow.

Similar letters refer to similar parts wherever they occur on the different parts of the drawings.

In the drawings, A represents the plow-beam, to the forward end of which is attached the clevis B, as usual.

C represents the handle-post, the lower end of which is firmly secured to the lower sole portion or runner D, which, when made of wood, is preferably provided with a metal shoe $d$, as shown in Figs. 1 and 3. To the post C is secured in a suitable manner a handle E for guiding the plow while in use. In practice the post C terminates at its upper end as a projection C', which may be used as a rein-holder during the use of the plow, as may be desired.

The rear end of the beam A is pivotally connected at $a$ to the handle-post C, as shown in Fig. 1.

F is the colter, the lower end of which is secured in a suitable manner to the runner D. The upper end of said colter is connected to the handle-post C by means of a stay or brace G, as shown in Fig. 1. The colter F is pivotally connected to the plow-beam A by means of a bolt $f$, provided with a thumb-nut $f'$. (Shown in Fig. 1.) A series of perforations $f''\ f''$ are made in the colter F for the purpose of adjusting the position of the beam F relative to said colter according to the depth of the furrow desired to be plowed, which may be determined by the vertical adjustment of the forward end of the plow-beam.

To the forward end of the base portion D is secured the triangular or similarly-shaped plowshare H, the sides of which are inclined from the center in lateral directions, as shown in Figs. 1, 2, and 3. To the upper side of the share H is secured a bar I, the rear end of which is preferably forked, as shown in Fig. 2, and suitably connected to the colter F, as shown in said Figs. 1, 2, and 3. In connection with said plowshare is used a pulverizer adapted to disintegrate and break up the earth as it is being cut and turned over by the said share, and such device is preferably made as represented in detail in Fig. 4. It consists of a Y-shaped plate of metal K, having a tongue $k$, attached in a suitable manner to the share H and provided with rearwardly-extending flaring ears $k'\ k'$, as shown. The said pulverizer is secured to the runner D, share H and bar I by means of a suitable fastening-bolt L. (Shown in Figs. 1, 2, and 3.)

In using the plow the beam A is adjusted in a vertical plane and secured to the colter F in position according to the depth of furrow desired to be made. As the plow is moved forward the point of the share H is caused to enter the earth at a suitable depth when guided by the operator, causing the earth to be turned over and deposited on opposite sides of the furrow, and such overturned earth will be disintegrated and pulverized by the outwardly and upwardly flaring ears $k'\ k'$ ready for receiving the seeds to be planted. After the seeds have been planted in the furrow made the plow is drawn between the furrows, causing the seeds to be covered by the action of the ears $k'\ k'$, which cause the pulverized earth to fall over the seeds in the furrows as the plow is being drawn onward by the draft-animal.

The device is also useful as a drill-plow for the purpose of digging up the tubers when ripe.

The frame portions A C D are shown in the drawings as being made of wood; but we do not desire to limit ourselves to such exact construction, as such parts may be made of metal without departing from the essence of our invention.

What we desire to secure by Letters Patent and claim is—

1. In a plow, a beam A, a colter F, adjustably connected to said beam and a handle-post C, pivotally connected to said beam, and secured to the upper end of said colter, in combination with a pointed and outwardly-flaring share H, and rearwardly and outwardly extended pulverizer-ears $k'$ $k'$, substantially as and for the purpose set forth.

2. In a plow, in combination with a base or runner D and a colter F, secured thereto, a duplex and pointed share H, and a bolt L, secured together and to said base and colter, and a pair of rearwardly and outwardly extended pulverizer-ears $k'$, $k'$, substantially as and for the purpose set forth.

3. In a plow, in combination with a base D, and a colter F secured thereto, a duplex and pointed share H, secured to said base and a Y-shaped pulverizer K, secured to said share and having rearwardly and outwardly flaring pulverizer-ears $k'$, $k'$, substantially as and for the purpose set forth.

In testimony whereof we have affixed our signatures in presence of two witnesses.

PER J. JOHANSSON.
LAGE L. JONSSON.

Witnesses:
ALBAN ANDRÉN,
WILLARD B. ELLISON.